United States Patent [19]

Shigemasa et al.

[11] Patent Number: 4,641,235
[45] Date of Patent: Feb. 3, 1987

[54] PROCESS CONTROL APPARATUS WITH PROCESS DEPENDENT SWITCHING BETWEEN PROCESS CONTROL MODES

[75] Inventors: Takashi Shigemasa; Yoshinori Ichikawa, both of Yokohama, Japan

[73] Assignee: Kabushiki Kaisha Toshiba, Kawasaki, Japan

[21] Appl. No.: 653,908

[22] Filed: Sep. 25, 1984

[30] Foreign Application Priority Data

Sep. 26, 1983 [JP] Japan ............................ 58-176434

[51] Int. Cl.$^4$ ............................................ G05B 13/04
[52] U.S. Cl. .................................... 364/149; 364/162; 318/610
[58] Field of Search ............... 364/158, 159, 160, 161, 364/162, 163, 149; 318/561, 610, 609

[56] References Cited

U.S. PATENT DOCUMENTS

| | | | |
|---|---|---|---|
| 4,214,300 | 7/1980 | Barlow | 364/159 |
| 4,232,364 | 11/1980 | Bibbero | 364/159 |
| 4,407,013 | 9/1983 | Arcara | 364/162 |
| 4,451,878 | 5/1984 | Shigemasa | 364/162 |

OTHER PUBLICATIONS

A Link Between Science and Applications of Automatic Control, Proceedings of The Seventh Triennial World Congress of the International Federation of Automatic Control, vol. 1, Jun. 12–16, 1978, "An Adaptive Controller for Slow Processes with Variable Control Periods, pp. 461–467.

Primary Examiner—Jerry Smith
Assistant Examiner—Allen MacDonald
Attorney, Agent, or Firm—Schwartz, Jeffery, Schwaab, Mack, Blumenthal & Evans

[57] ABSTRACT

The process control apparatus according to the present invention is adapted to control the process automatically in compliance with the state of the process characteristics. In the process control apparatus, when the process characteristics are found to be in a steady state, the control is performed by a first process control operational means suited for sample controlling the process according to the control constants for the first process control operational means as determined during the control of a second process control operational means, while, when the process characteristics vary frequently, the control is performed by the second process control operational means which is suited from sample controlling the process.

16 Claims, 23 Drawing Figures

FIG.4

$$u_1(k) = \frac{\gamma(k+\ell) - \sum_{i=1}^{n_q} q_i u_1(k-i) - \sum_{i=0}^{n_\gamma} v_i y(k-i) - d'}{q_0}$$

FIG.5

$\theta^T = [q_0, q_1, \ldots, q_{ng}, v_0, v_1, \ldots, v_{nv}, d']$ $\phi(k) = [u(k), u(k-1), \ldots, u(k-n_q), y(k), \ldots, y(k-n_v), 1]$ $\epsilon(k) = y(k) - \theta^T(k-1) \cdot \phi(k-\ell)$ $\omega_k = \phi^T(k-\ell) \cdot P(k-1) \cdot (k-\ell)$ $\mu_k = 1 - \omega_k - \frac{\epsilon(k)^2}{J^*}$ $\lambda(k) = \frac{\mu_k + \sqrt{\mu_k^2 + 4\omega_k}}{2}$ $\theta(k) = \theta(k-1) + \frac{P(k-1)\phi(k-\ell) \cdot \epsilon(k)}{\lambda(k) + \omega_k}$ $P(k) = \frac{[P(k-1) - \frac{P(k-1)\phi(k-\ell)\phi^T(k-\ell)P(k-1)}{\lambda(k) + \omega_k}]}{\lambda(k)}$

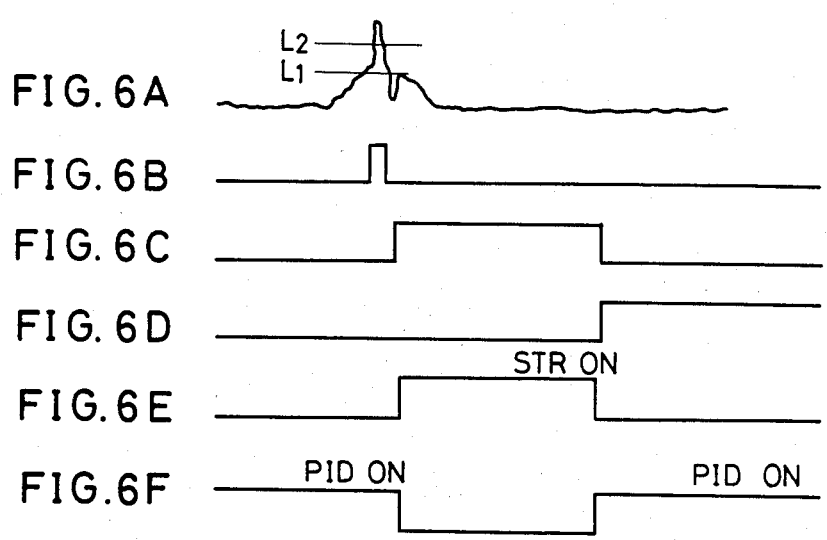

FIG.10a $$G(z^{-1}) = \frac{q_0 + q_1 z^{-1} + \ldots + q_{nq} z^{-nq}}{1 - \upsilon_0 z^{-\ell} - \upsilon_1 z^{-(\ell+1)} - \ldots - \upsilon_{nv} z^{-(nv+\ell)}}$$

$$B_0 = \sum_{i=0}^{nq} q_i \qquad\qquad A_0 = 1 - \sum_{i=0}^{nv} \upsilon_i$$

$$B_1 = -\tau \cdot \sum_{i=1}^{nq} i \cdot q_i \qquad\qquad A_1 = \tau \cdot \sum_{i=0}^{nv} i \cdot \upsilon_i$$

$$B_2 = \frac{\tau^2}{2!} \cdot \sum_{i=1}^{nq} i^2 q_i \qquad\qquad A_2 = -\frac{\tau^2}{2!} \sum_{i=0}^{nv} i^2 \upsilon_i$$

$$B_3 = -\frac{\tau^3}{3!} \cdot \sum_{i=1}^{nq} i^3 q_i \qquad\qquad A_3 = \frac{\tau^3}{3!} \sum_{i=0}^{nv} i^3 \upsilon_i$$

- - - - - - - - - - -      - - - - - - - - - - - -

---

$$\tilde{C}_0 = \frac{A_0}{B_0}$$

$$\tilde{C}_1 = \frac{(A_1 - \tilde{C}_0 B_1)}{B_0}$$

$$\tilde{C}_2 = \frac{(A_2 - \tilde{C}_0 B_2 - \tilde{C}_1 B_1)}{B_0}$$

$$\tilde{C}_3 = \frac{(A_3 - \tilde{C}_0 B_3 - \tilde{C}_1 B_2 - \tilde{C}_2 B_1)}{B_0}$$

FIG. 11

$$\beta_2 = \frac{1}{2}\alpha + \frac{3}{8}(1-d)$$

$$\beta_3 = \frac{3}{20}\alpha + \frac{1}{16}(1-d)$$

$$\beta_4 = \frac{3}{100}\alpha + \frac{1}{256}(1-d)$$

---

$$(\hat{g}_2 + i\hat{g}_1 + \frac{\tau^2}{3}\hat{g}_0)\beta_4\sigma^3 + (-\hat{g}_3 + \frac{7}{12}i\hat{g}_1 + \frac{\tau^3}{4}\hat{g}_0)\beta_3\sigma^2 + (-\hat{g}_3 - \frac{7}{12}i\hat{g}_2$$
$$+ \frac{\tau^3}{18}\hat{g}_0)\tau\beta_2\sigma - (\frac{\hat{g}_3}{3} + \frac{\tau}{4}\hat{g}_2 + \frac{\tau^2}{18}\hat{g}_1)\tau^2 = 0$$

Solve for the smallest positive root of the above

---

$$C_0 = \frac{(\hat{g}_2 + i\hat{g}_1 + \frac{\tau^2}{3}\hat{g}_0)}{\sigma \cdot (\sigma^2\beta_3 + \tau \cdot \beta_2 \cdot \sigma + \frac{\tau^2}{3})}$$

$$C_1 = C_0 \cdot \sigma - \hat{g}_0$$

$$C_2 = \beta_2\sigma^2 C_0 + \frac{\tau}{2}C_1 - \hat{g}_1$$

---

$$K_c = C_1$$
$$T_i = C_1/C_0$$
$$T_d = C_2/C_1$$

PROCESS CONTROL APPARATUS WITH PROCESS DEPENDENT SWITCHING BETWEEN PROCESS CONTROL MODES

BACKGROUND OF THE INVENTION

1. Field of the Invention

The present invention relates to a process control apparatus that can precisely control a process in accordance with the state or charasterictics of the process.

2. Description of the Prior Art

In process controlling the temperature, flow, pressure, and the like of a plant, the PID control method is widely employed. In particular, for steady states, the operation signals from the PID control apparatus are stable and the PID control performance has been implemented extensively for a long time with skilled engineers. On the other hand, in order to appropriately execute control with a process control system that employs the PID method, it is necessary to adjust, or tune, suitably the control constants of the PID control apparatus in compliance with the characteristics of the process. However, the tuning for an appropriate PID control, at all times, of a process in which the characteristics vary frequently due to external disturbances, load, and so forth is a difficult job which is a serious burden to the operator. For this reason, there has been proposed a sampling PID control apparatus (described, for example, in Japanese patent No. 90704/1982) which is equipped with an auto-tuning mechanism for automating the tuning work for the PID control. As an improvement over this, there has been a demand for an apparatus that can provide a satisfactory control performance even for cases where the process characteristics vary frequently, such as the case where the process chasacteristics change during the period in which the characteristics of the process are being identified.

On the one hand, it has been known, for processes in which characteristics vary frequently, that an adaptive process control that employes the minimum variance control method, deadbeat control method, pole assignment control method, or the like is effective. Description of these control methods can be found, for example, in H. Kurz et a., "Development, Comparison and Application of Various Parameter—Adaptive Digital Control Algorithms" (Preceeding of the 7th IFAC Congress, Helsinki (1978), pp. 443–452) or in K. J. Astrom et al., "On Self Tuning Regulators" (Automatica, 1973, No. 9, pp. 185-199). On the other hand, there are disadvantages in these control methods that they may shorten the life of control equipments and the like due to the tendency of greatly modifying the operation signals in controlling the process, even in steady states where these are no changes in process characteristics. Furthermore, in contrast to the number of three, at the most, of the control constants for the PID control apparatus, the corresponding number of control constants for these methods may exceed ten, making the mannal tuning of the apparatus extremely difficult. These factors represent the obstacles in introducing the adaptive control methods into the practical scheme of process control.

SUMMARY OF THE INVENTION

The object of the present invention is to offer a process control apparatus which operates satisfactorily for situations where the process characteristics vary frequently as well as for the situations where they are in steady states.

In order to achieve the above and other objects, advantages, and effects, the present invention comprises a process control apparatus which consists principally of: a first process control operational means which controls the process when the process characteristics for the PID control, I-PD control, and the like that sample control the process are in steady states; a pluse transfer function identification means which identifies the parameters of the estimated process model from the process control signal (input signal) and the process signal (output) that are obtained by sampling the process control quantities; a control constant operational means which computes the control constants of said first process control operational means from the identified pulse transfer function; a second process control operational means, such as the minimum variance control, deadbeat control, pole assignment control, and the like, which controls the process when the process characteristics were found to vary frequently inputting said pulse transfer function; a switching means which selects the output signal of either one of said first process control operational means or said second process control operational means as the operation signal of the process; and a mode control means which drives said control constant operational means as well as the switching means to set the operation signal for the process as the output signal of the first process control operational means when the process characteristics are found to be in a steady state based on the foregetting factor determined in the identification process of said pulse transfer function identification means, and drives the switching means to set the operation signal for the process as the output of the second process control operational means when there is detected a change in the process characteristics as a result of computation with the pulse transfer function data from said pulse transfer function identification means, control signal for the process, and the process signal as the input.

According to the present invention the process control system is provided with the first process control means which is adapted to sample control the process when the characteristics of the process to be controlled are in a steady state and the second process control means which is adapted to sample control the process when the process characteristics are varying frequently. The process control apparatus is arranged in such a way that when the process characteristics are not constant the control is carried out with the second process control means, whereas when the characteristics are constant the control is carried out with the first process control means based on the control constants for the first control means as determined by the process characteristics that are identified while the process is controlled by the second process control means, so that it is possible to execute a control appropriate for the state of the process characteristics, permitting one to have a satisfactory control performance for process whose characteristics vary frequently as well as for processes whose characteristics are constant. Moreover, when a steady state is realized, the control constants of the control system due to the second process control means are designed automatically by using the process characteristics that are identified while the process is controlled by the second process control means, which causes the control action to shift to the first process control means so that the control signals for the process suffer no large change, allowing the life of the operation terminals to extend longer.

BRIEF DESCRIPTION OF THE DRAWING

This invention can be more fully understood from the following detailed description when taken in conjunction with accompanying drawings, in which:

FIG. 4 is a flow chart of the operation for the minimum variance control operational means in the embodiment shown in FIG. 1;

FIG. 5 is a flow chart of the identification for the least squares identification filter in the embodiment shown in FIG. 1;

FIGS. 6A–6F are time charts showing the action of the present embodiment;

FIGS. 10a and 10b are flow charts of the operation for the transfer function operational unit in the embodiment shown in FIG. 1;

FIG. 11 is a flow chart of the operation for the PID control constant operational unit in the embodiment shown in FIG. 1;

DETAILED DESCRIPTION OF THE PREFERRED EMBODIMENTS

Figure 1:
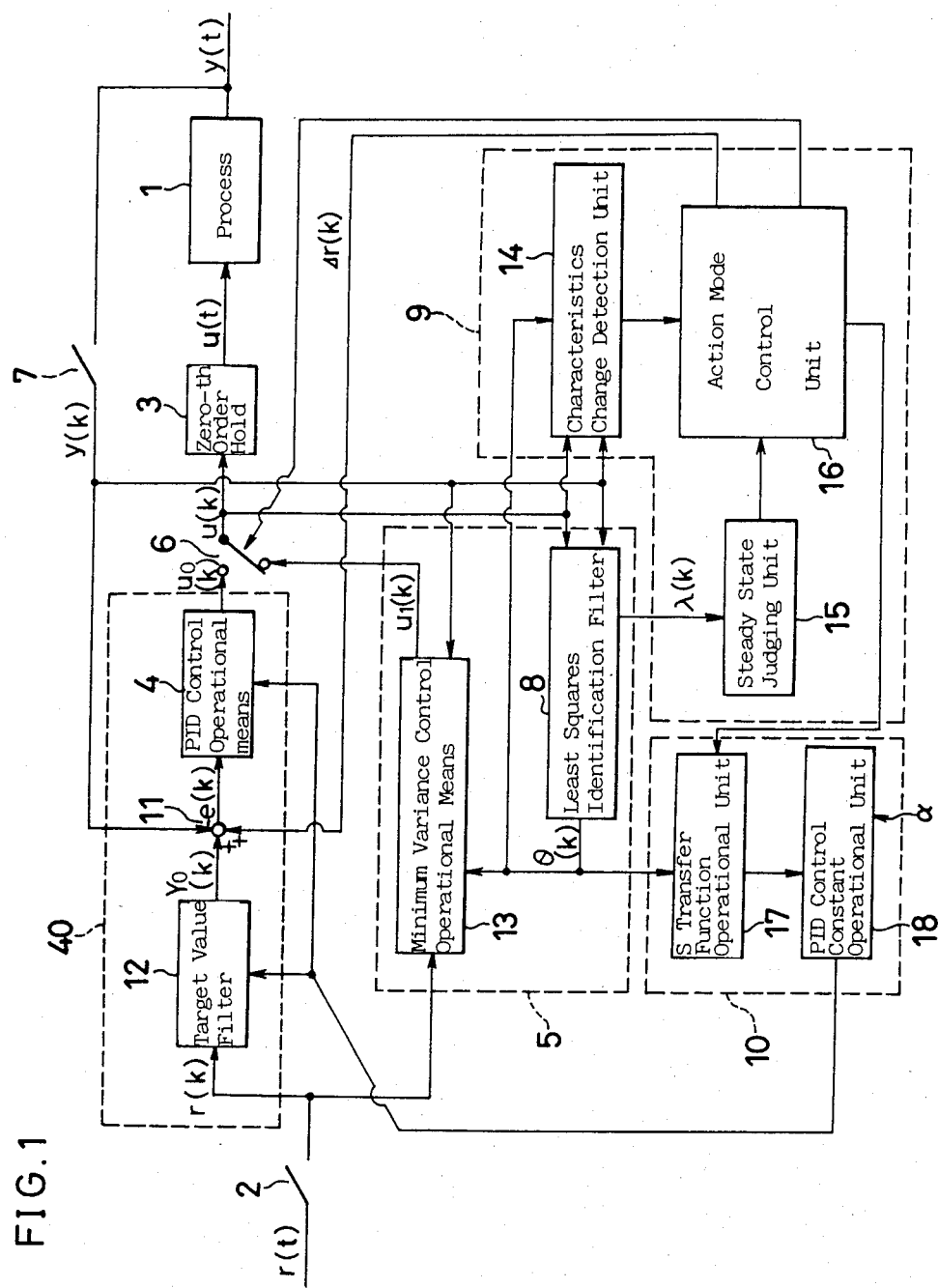
FIG. 1 is a block diagram showing an embodiment of a process control apparatus in accordance with the present invention.

Referring to FIG. 1 there is shown an embodiment of the invention. In order for the reference signal r(k), which is sampled by a second sampler 2, to be controlled by the PID or minimum variance method, a process 1 to be controlled is connected via a 0-th order hold 3 to one of a PID control operational means 4 in the process control operational means 40 or a self-tuning regulator (STR) 5, through an action mode alteration switch 6 which constitutes the switching means. The switching of the connection is controlled by a mode control means 9 based on the results of the operation in which the input data comprises the process signal y(k) sampled from the output signal y(t) of the process 1 with a first sampler 7, the control signal u(k) to the process 1 which is sample-held by the 0-th order hold 3, the identification signal $\theta(k)$ which is the output of a least squares identification filter 8 that constitutes the STRs to be described later, and a forgetting factor $\lambda(k)$. On the other hand, the control constants for the PID control operational means 4 are computed by control constant operational means 10, upon receipt of the operation execution signal from the mode control means 9, by using, as the input, the identification signal $\theta(k)$ which represents the output of the least squares identification filter 8. Here, the sampling interval of the first sampler 7 and second sampler 2 is $\tau$, the discrete time is k, and the continuous time t is given by (k·$\tau$).

Figure 2:
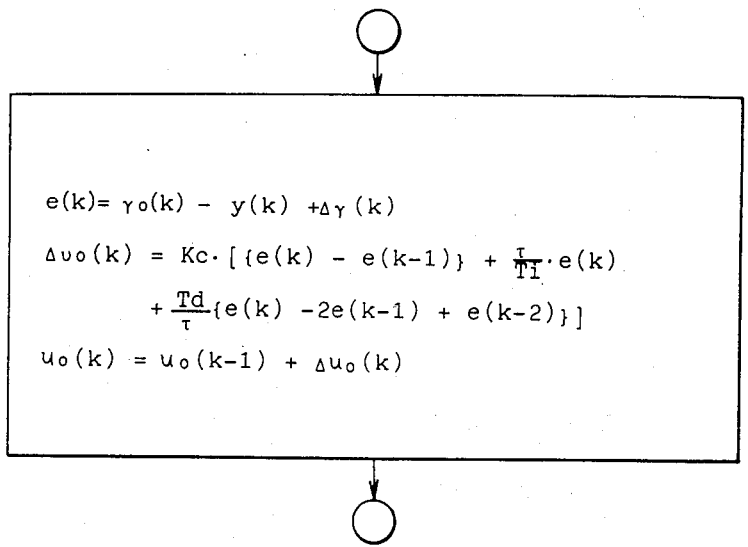
FIG. 2 is a flow chart of the operation for the PID control operational means in the embodiment shown in FIG. 1.

The PID control operational means 4 computes the output signal $u_0(k)$, given by the following equation, for PID controlling the process by using the deviation e(k), the integral time constant Ti, and the differential time constant Ti that are computed by the control constant operational means 10, as shown in FIG. 2.

$$u_0(k) = u_0(k-1) + \Delta u_0(k), \qquad \text{Eq.(1)}$$

$$\Delta u_0(k) = Kc \cdot [e(k) - e(k-1) + \frac{Kc \cdot \tau}{Ti} \cdot e(k) + \qquad \text{Eq. (2)}$$

$$\frac{Kc \cdot Td}{\tau} \cdot [e(k) - 2e(k-1) + e(k-2)]$$

The deviation e(k) is computed at the deviation computational means 11 by the following expression from inputs represented by $r_0(k)$, the output via the reference signal filter 12 of the reference signal samples by the second sampler 2, the process signal y(k) sampled by the first sampler 1, and the dynamic characteristics change proving pulse $\Delta r(k)$, to be explained later, which is the output of the mode control means 9.

$$e(k) = r_0(k) - y(k) + \Delta r(k) \qquad \text{Eq.(3)}$$

Figure 3:
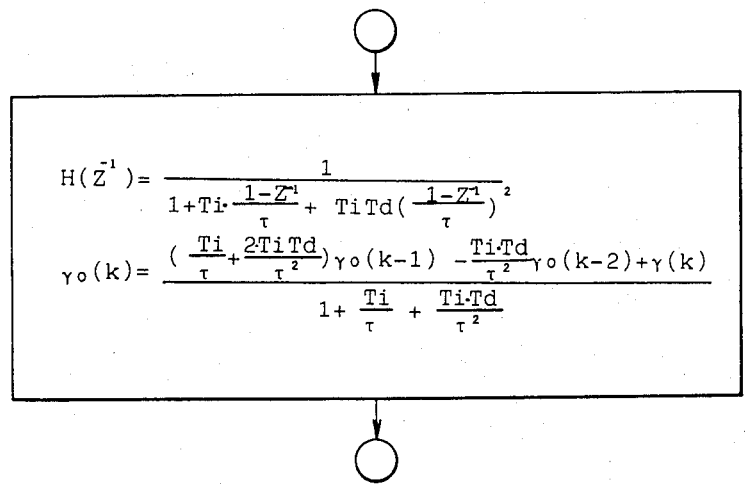
FIG. 3 is a flow chart of the operation for the reference filter in the embodiment shown in FIG. 1.

Further, the transfer function $H(z^{-1})$ of the reference signal filter 12 is determined by eq.(4) below from the PID control constants, namely, the proportional gain Kc, the integral time constant Ti, and the derivative time constant Td, that are computed at the control constant operational means 10 which is to be described later, whereupon the output $r_0(k)$ is given as shown by Eq.(4') and in FIG. 3.

$$H(z) = \frac{1}{1 + \frac{1-z^{-1}}{\tau} \cdot Ti + Ti \cdot Td \cdot \left(\frac{1-z^{-1}}{\tau}\right)^2} \qquad \text{Eq. (4)}$$

$$r_0(k) = \frac{\left(\frac{Ti}{\tau} + \frac{2 \cdot Ti \cdot Td}{\tau^2}\right) \cdot r_0(k-1) - \frac{Ti \cdot Td}{\tau^2} \cdot r_0(k-2) + r(k)}{1 + \frac{Ti}{\tau} + \frac{Ti \cdot Td}{\tau^2}} \qquad \text{Eq. (4')}$$

Self-tuning regulator 5 consists of two parts; the first is the least squares identification filter 8 which identifies the pulse transfer function representing the dynamic characteristics of process 1 from the process signal y(k) and the operation signal u(k) to the process 1 that is sample-held by the 0-th order hold 3 and the second part is the least squares control operational means 13 which computes the control signal $u_1(k)$ for controlling the process 1 by the minimum variance control method by using the identification coefficient signal $\theta(k)$ and the reference value signal r(k) that is sampled by the second sampler 2 as the input.

The operation signal $u_1(k)$ delivered by the minimum variance control operational means 13 is determined in accordance with the state of the characteristics for the process 1, and said state of characteristics can be modeled as follows, in terms of the operation signal u(k) to the process 1 and the output y(k) of the process 1:

$$A(z^{-1}) \cdot y(k) = z^{-l} \cdot B(z^{-1}) \cdot u(k) + \epsilon(k) + d \qquad \text{Eq.(5)}$$

where $A(z^{-1})$ and $B(z^{-1})$ are polynominals of the time shift operator $z^{-1}$ as given below.

$$A(z^{-1}) = 1 + a_1 z^{-1} + a_2 z^{-2} + \ldots + a_n z^{-n}, \qquad \text{Eq.(6)}$$

$$B(z^{-1}) = b_1 z^{-1} + b_2 z^{-2} + \ldots + b_m z^{-m}. \qquad \text{Eq.(7)}$$

In the above, d is the direct current component around the equilibrium point of the process 1 and $\epsilon(k)$ is a white noise with average value zero. Then, the pulse transfer function for the process 1 can be represented by the following expression.

$$G(z^{-1}) = \frac{B(z^{-1})}{A(z^{-1})} \cdot z^{-l} \qquad \text{Eq.(8)}$$

Further, upon using a relation represented by Eq.(9), Eq.(5) can constitute an estimated model for the process as given by Eq.(10).

$$A(z^{-1}) \cdot F(z^{-1}) + z^{-l} J(z^{-1}) = 1 \qquad \text{Eq.(9)}$$

$$y(k+l) = V(z^{-1}) \cdot y(k) + Q(z^{-1}) \cdot u(k) + W(z^{-1}) \cdot \epsilon(k+l) + d' \qquad \text{Eq.(10)}$$

where $$Q(z^{-1}) = B(z^{-1}) \cdot F(z^{-1}) = q_0 + q_1 z^{-1} + \ldots + q_{nq} z^{-nq}, \qquad \text{Eq.(11)}$$

$$V(z^{-1}) = J(z^{-1}) = 1 + v_1 z^{-1} + \ldots + v_{nv} z^{-nv}, \qquad \text{Eq.(12)}$$

$$W(z^{-1}) = F(z^{-1}) = 1 + w_1 z^{-1} + \ldots + w_{nw} z^{-nw}, \qquad \text{Eq.(13)}$$

and $$d' = F(z^{-1}) \cdot d. \qquad \text{Eq.(14)}$$

Therefore, $\epsilon(k)$ represents a white noise with average zero, and since $y(k+1)$ and $W(z^{-1}) \cdot \epsilon(k+1)$ are orthogonal, providing that $V(z^{-1})$, $Q(z^{-1})$, and $d'$ are known, the operation signal $u(k0)$ to effect a minimum variance control can be found from the estimated model for the process 1 by the following equations, that is, the operation is performed by the minimum variance control operational means 13 as shown in FIG. 4.

$$u(k) = u_1(k) \qquad \text{Eq.(15)}$$

$$u_1(k) = \frac{r(k+l) - \sum_{i=1}^{n_q} q_i \cdot u_i(k-i) - \sum_{i=0}^{n_v} v_i \cdot y(k-i) - d'}{q_0} \qquad \text{Eq.(16)}$$

On the other hand, although it was described in the foregoing that the minimum variance control operational means 13 commutes the operation signal $u_1(k)$ with the understanding that the parameters ($q_0 \ldots, q_{nq}$, $v_0, v_1, \ldots, v_{nv}$, $d'$) of the estimated model for the process 1 (Eq. 10 through Eq. 14) are known, the identification of these parameters is carried out by the least squares identification filter 8 in the manner explained below (see FIG. 5). Let the unknown vector whose components consist of these parameters be called $\theta$, and let vector $\phi(k)$ be defined by the following:

$$\theta^T = [q_0, \ldots, q_{nq}, v_0, v_1, \ldots, v_{nv}, d'] \qquad \text{Eq.(17)}$$

(where T signifies the transposition), $$\phi^T(k) = [u(k), \ldots, u(k-n_q), y(k), \ldots, y(k-n_v), 1] \qquad \text{Eq.(18)}$$

By the use of these two equations the estimated model for the process 1 represented by Eq.(10) may also be expressed as follows.

$$y(k) = \theta^T \cdot \phi(k-l) + \epsilon(k) \qquad \text{Eq.(19)}$$

Therefore, the unknown parameter vector $\theta$ is identified as given below.

$$\theta(k) = \theta(k-1) + \frac{P(k-1) \cdot \phi(k-l) \cdot \epsilon(k)}{\lambda(k) + \phi^T(k-l) \cdot P(k-1) \cdot \phi(k-l)}, \qquad \text{Eq. (20)}$$

$$P(k) = \frac{\left[ P(k-1) - \frac{P(k-1) \cdot \phi(k-l) \cdot \phi^T(k-l) \cdot P(k-1)}{\lambda(k) + \phi^T(k-l) \cdot P(k-1) \cdot \phi(k-l)} \right]}{\lambda(k)}, \qquad \text{Eq. (21)}$$

$$\epsilon(k) = y(k) - \theta^T(k-1) \cdot \phi(k-l). \qquad \text{Eq.(22)}$$

Here, the forgetting factor $\lambda(k)$ is computed by the equations given below based on the residuals $\lambda(k)$ to improve the follow-up capability during changes in the characteristics.

$$\lambda(k) = \frac{\mu k + \sqrt{\mu^2 k + 4 \cdot \omega k}}{2} \qquad \text{Eq. (23)}$$

$$\mu k = 1 - \omega k - \frac{\epsilon(k)^2}{J^*} \qquad \text{Eq. (24)}$$

$$\omega k = \phi^T(k-l) \cdot P(k-1) \cdot \phi(k-1) \qquad \text{Eq.(25)}$$

Further, $J^*$ is a positive real number which is determined by the variance $\theta_\epsilon^2$ of the residuals $\epsilon(k)$.

In this way, the output $u_1(k)$ of the minimum variance control operational means 13 is computed at STR 5 by Eqs.(15) and (16) using the parameter $\theta(k)$ identified by the least squares identification filter 8 based on the data obtained at each sampling period. Moreover, as the algorithm for computing the operation signal to the process for realizing a minimum variance control based on the parameter identification result for the estimated model for the process, one may employ, in addition to the method described in the foregoing, such a method, as found, for example in H. Kurz, "Development, Comparison and Application of Various Parameter Adaptive Digital Control Algorithms" (Proceeding of the 7th IFAC Congress, Helsinki (1978), pp. 443-452).

The mode control means 9 consists of the following three parts; the characteristics change detection unit 14 which detects the characteristics of the process 1 by inputting the control signal u(k) for the process, the process signal y(k), and the unknown parameter vector $\theta(k)$ identified by the least squares filter 8; the steady state judging unit 15 which detects, based on the foregetting factor $\lambda(k)$ determined in the identification process with the least squares filter 8, that the characteristics of the process reached a steady state; and the action mode control unit 16 which controls the switching of the action mode alteration switch 6 and at the same time drives the control constant operational means 10 that is to be explained later. In what follows each constituent element will be explained referring to the time charts shown in (A) through (F) of FIG. 6. In FIG. 6 curve (A) represents the waveform of the error in the estimated model $\eta(k)$, (B) the dynamic characteristics change proving pulse $\Delta r(k)$, (C) the demand signal for the action mode switch which is the output of the characteristics change detection unit 14, (D) the demand signal for the action mode switch which is the output of the steady state judging unit 15, and (E) and (F) give the curves showing the states of the minimum variance control and the PID control, respectively.

Figure 7:
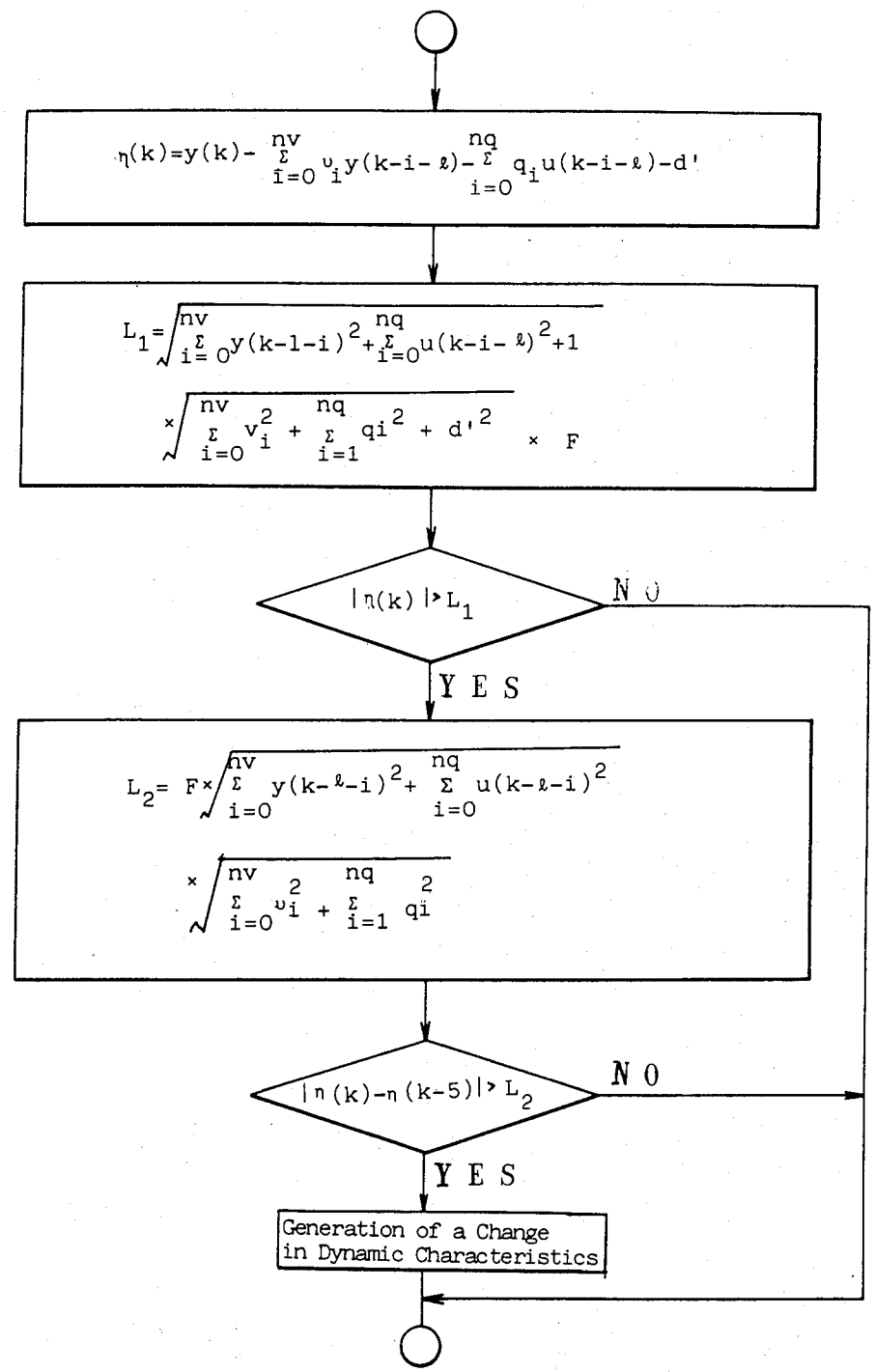
FIGS. 7 and 8 are flow charts of the operation for the characteristics change detection unit in the embodiment shown in FIG. 1.
Figure 8:
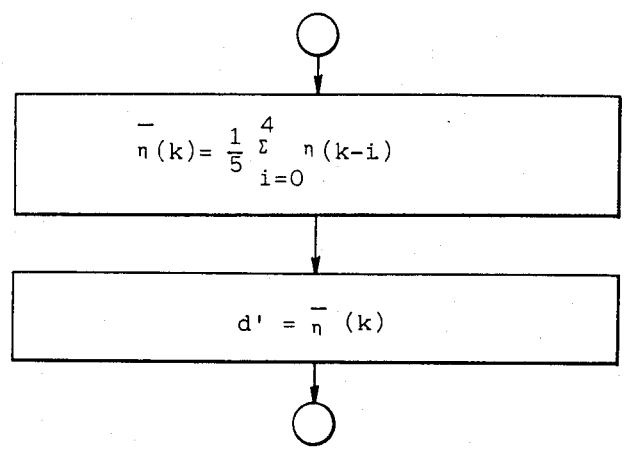

The characteristics change detection unit 14 detects the change in the characteristics of the process 1 in the manner as explained below (see FIGS. 7 and 8). First, the detection unit 14 computes the error $\eta(k)$ of the estimated model for the process 1, based on the parameter $\theta(k)$ of the estimated model that is identified by the least squares filter 8, from the operation signal u(k) for the process 1 and the process signal y(k), as defined by the following expression (see FIG. 6 (A)).

Eq. (26)
$$\eta(k) = y(k) - v(z^{-1}) \cdot y(k - l) - Q(z^{-1}) \cdot u(k - l) - d'$$
$$= y(k) - \sum_{i=0}^{n_v} Vi \cdot y(k - i - l) - \sum_{i=0}^{n_q} qi \cdot u(k - i - l) - d'$$

In the result of this operation, the expectation value of the estimated model error $\eta(k)$ will vanish if the characteristics of the process 1 do not change, whereas it will not vanish but will give rise to a direct current component if the characteristics do change. Then, the characteristics change detection unit 14 suspects that there occurred a change in the characteristics of the process 1 if the estimated model error (k) satisfies the condition $|\eta(k)| > L_1$ when compared with the first threshold value $L_1$ fined by Eq.(27) given below (see FIG. 6(A).

Eq. (27)
$$L_1 = \left\{ \sum_{i=0}^{n_v} y(k - l - i)^2 + \sum_{i=0}^{n_q} u(k - l - i)^2 + 1 \right\}^{\frac{1}{2}} \times$$
$$\left\{ \sum_{i=0}^{n_v} vi^2 + \sum_{i=1}^{n_q} qi^2 + d'^2 \right\}^{\frac{1}{2}} \times F$$

The characteristics change detection unit 14, then delivers its output to the action mode control unit 16, and the control unit in turn delivers an output, the confirmation pulse of a change in the dynamic characteristics $\Delta r(k)$, to the deviation computer 11 (see FIG. 6(B)). Accordingly, in the event that the dynamic characteristics of the process change, the error in the estimated model $\eta(k)$ will undergo noticeable fluctuations under the influence of the confirmation pulse $\Delta r(k)$. Then, if these fluctuations satisfy the condition, $$|\eta(k) - \eta(k-m)| > L_2$$

(m: example 5)

Eq. (28)
$$L_2 = F \times \left\{ \sum_{i=0}^{n_v} y(k - l - i)^2 + \sum_{i=0}^{n_q} u(k - l - i)^2 \right\}^{\frac{1}{2}} \times$$
$$\left\{ \sum_{i=0}^{n_v} vi^2 + \sum_{i=0}^{n_q} qi^2 \right\}^{\frac{1}{2}}$$

compared with a second threshold value $L_2$ defined by Eq.(28) (see FIG. 6(A)), the characteristics change detection unit 14 judges that there occurred a change in the dynamic characteristics of the process 1 and delivers a demand signal for the action mode switch to the action mode control unit 16 in order to shift control of the process 1 from the PID control to the minimum variance control due to STR 5 (See FIG. 6(C)). Also, in case no fluctuation occurred in the estimated model error $\eta(k)$ and a change is observed only in the direct current component d' as a result of applying said confirmation pulse in the dynamic characterics $\Delta r(k)$, said detection unit judges that no change is generated in the dynamic charcteristics of the process 1. Hence the characteristics change detection unit 14 corrects the direct current component d' to a value like, for example, Eq. (29)
$$d' = \bar{\eta}(k) = \frac{1}{n_\eta} \cdot \sum_{i=0}^{n_\eta - 1} \eta(k - i)$$

in order to adjust the estimated model error $\eta(k)$ to vanish. (Here, we set n=5, and, more generally, average over (k−i, i=0, ..., N). In addition, the quantity F in Eqs. (27) and (28) represents a prescribed factor (a number, for example, in the range 0.005–0.05).

The steady state judging unit 15 judges, as was mentioned earlier, that the characteristics of the process 1 is stable, based on the result of the foregetting factor $\lambda(k)$ from the least squares filter 8. This observation follows by noticing the fact that, as the characteristics of the process 1 approach a constant level, in accordance with the diminishing of the residuals $\epsilon(k)$ given by Eq.(22), the forgetting factor $\lambda(k)$ approaches unity as a result. Therefore, the steady state judging unit 15 judges that the process 1 reached steady state as soon as it detects that the forgetting factor $\lambda(k)$ exceeded a certain prescribed threshold value (0.98, for example), and it provides the action mode control unit 16 with both of an action mode switch demand signal in order to shift the control of the process 1 from the minimum variance control due to STR 5 to the PID control (see FIG. 6(D)) and an operation execution command signal in order to drive the control constant operational means 10.

Figure 9:
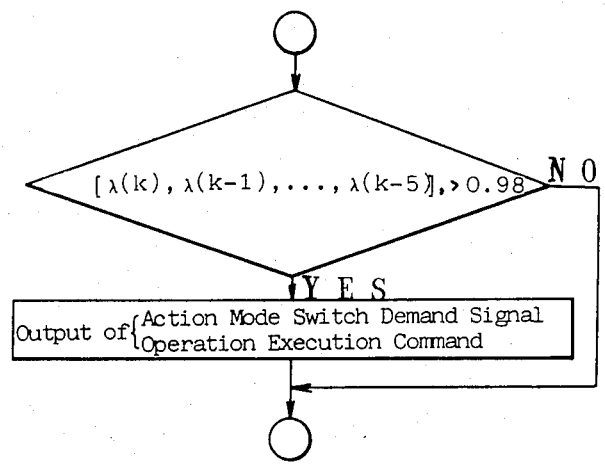
FIG. 9 is a flow chart of the operation for the action mode control unit in the embodiment shown in FIG. 1.

The action mode control unit 16 operates the connection contact of the action mode alteration switch 6 when provided with an action mode switch demand signal from the characteristics change detection unit 14 or the steady state judging unit 15 (see FIGS. 6(E) and 6(F)), and it also outputs an operation execution signal to the control constant operational means 10 in order to PID control the process 1 based on the PID control constants upon receipt of an operation execution command signal from the steady state judging unit 15 (see FIG. 9).

The control constant operational means 10 consists of two parts, namely, the s transfer function operational unit 17 which computes, upon receipt of said operation execution signal, the s domain transfer function for the process 1 by receiving the parameter signal $\theta(k)$ that was identified by the least squares filter 8, and the PID control constant operational unit 18 which computes the proportional gain $K_c$ the integral time constant $T_i$ and the differential time constant $T_d$ the PID control with the transfer function that was determined by the s transfer function operational unit 17.

Figure 10B:
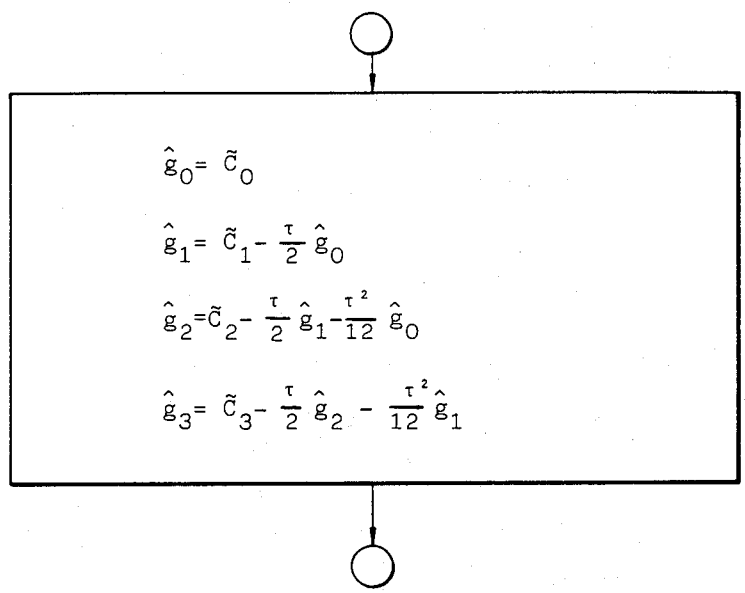

Upon receipt of an operation execution signal from the action mode control unit 16, the s transfer function operational unit 17 computes the lower dimension parameters $\hat{g}_i (i=0,1,2,3,\ldots)$ of the s transfer function $\hat{G}(s)$ in the manner explained below (see) FIGS. 10(a) and 10(b)). First, by eliminating $F(z^{-1})$, $C(z^{-1})$, and $J(z^{-1})$ through substitution of Eqs.(9), (11), and (12) into Eq.(8), the pulse transfer function $G(z^{-1})$ of the process can be found in the following form by using the parameter (k) identified by the least squares filter 8.

$$G(z^{-1}) = \frac{Q(z^{-1})}{1 + z^{-1} \cdot V(z^{-1})} = \quad \text{Eq. (30)}$$

$$\frac{q_0 + q_1 \cdot z^{-1} + \ldots + q_{nq} \cdot z^{-nq}}{1 - V_0 z^{-l} - V_1 \cdot z^{-(l+1)} - \ldots - V_{nv} \cdot z^{-(nv+l)}}$$

Based on the pulse transfer function $G(Z^{-1})$ thus found the s transfer function $G(s)$ can readily be evaluated as given below by employing a known method (see, for example, "An Investigation on Methods of Deriving Low Frequency Characteristics of s Domain Transfer Function from the Pulse Transfer Function," Paper No. 1110, The Twentieth Scientific Meeting of SICE, 1981).

$$\hat{G}(s) = \frac{1}{\hat{q}_0 + \hat{q}_1 \cdot s + \hat{q}_2 \cdot s^2 + \hat{q}_3 \cdot s^3 + \ldots} \quad \text{Eq. (31)}$$

Where $$\hat{q}_0 = \tilde{C}_0, \quad \text{Eq. (32)}$$

$$q_1 = \tilde{C}_1 - \frac{\tau}{2} \cdot \hat{g}_0$$

$$q_2 = \tilde{C}_2 - \frac{\tau}{2} \cdot \hat{g}_1 - \frac{\tau^2}{12} \cdot \hat{g}_0$$

$$q_3 = \tilde{C}_3 - \frac{\tau}{2} \cdot \hat{g}_2 - \frac{\tau^2}{12} \cdot \hat{g}_1$$

...

In the above $$\tilde{C}_0 = \frac{A_0}{B_0} \quad \text{Eq. (33)}$$

$$\tilde{C}_1 = \frac{(A_1 - \tilde{C}_0 \cdot B_1)}{B_0}$$

$$\tilde{C}_2 = \frac{(A_2 - \tilde{C}_0 \cdot B_2 - \tilde{C}_1 \cdot B_1)}{B_0}$$

$$\tilde{C}_3 = \frac{(A_3 - \tilde{C}_0 \cdot B_3 - \tilde{C}_1 \cdot B_2 - \tilde{C}_2 \cdot B_1)}{B_0}$$

...

where $$B_0 = \sum_{i=0}^{n_q} q_i, \quad \text{Eq. (34)}$$

$$B_1 = -\tau \cdot \sum_{i=0}^{n_q} i \cdot q_i$$

$$B_2 = \frac{\tau^2}{2!} \cdot \sum_{i=0}^{n_q} i^2 \cdot q_i$$

$$B_3 = -\frac{\tau^3}{3!} \cdot \sum_{i=1}^{n_q} i^3 \cdot q_i$$

...

and $$A_0 = 1 - \sum_{i=0}^{n_v} V_i \quad \text{Eq. (35)}$$

$$A_1 = \tau \cdot \sum_{i=0}^{n_v} i \cdot V_i$$

$$A_2 = -\frac{\tau^2}{2!} \cdot \sum_{i=0}^{n_v} i^2 \cdot V_i$$

$$A_3 = \frac{\tau^2}{3!} \cdot \sum_{i=0}^{n_v} i^3 \cdot V_i$$

Using the s transfer function (Eq.(13)) evaluated at the s transfer function operational unit 17, the PID control constant operational unit 18 computes the PID control constants (namely, Kc, Ti, and Td) in the following way from the roots of the cubic equation given by Eq.(36) that follows from a design method based, for example, on model matching (see "Design Method for PID Control Systems with the reference signal Filter," paper No. 1071, The Twenty-fifth Scientific meeting of the Automatic Control Federation, 1982) (see FIG. 11).

$$\left( \hat{g}_2 + \tau \cdot \hat{g}_1 + \frac{\tau^3}{3} \hat{g}_0 \right) \cdot \beta_4 \cdot \sigma^3 + \quad \text{Eq. (36)}$$

$$\left( -\hat{g}_3 + \frac{7}{12} \cdot \tau \cdot \hat{g}_1 + \frac{\tau^3}{4} \cdot \hat{g}_0 \right) \cdot \beta_3 \cdot \sigma^2 +$$

$$\left( -\hat{g}_3 - \frac{7}{12} \cdot \tau \cdot \hat{g}_2 + \frac{\tau^2}{18} \cdot \hat{g}_0 \right) \cdot \tau \cdot \beta_2 \cdot \sigma -$$

$$\left( \frac{\hat{g}_3}{3} + \frac{\tau}{4} \hat{g}_2 + \frac{\tau^2}{18} \cdot \hat{g}_1 \right) \cdot \tau^2 = 0$$

-continued $$C_0 = \frac{\hat{g}_2 + \tau \cdot \hat{g}_1 + \frac{\tau^3}{3} \cdot \hat{g}_0}{\sigma \cdot \left( \sigma^2 \cdot \beta_3 + \tau \cdot \beta_2 \cdot \sigma + \frac{\tau^2}{3} \right)} \quad \text{Eq. (37)}$$

$$C_1 = C_0 \cdot \sigma - \hat{g}_0 \quad \text{Eq. (38)}$$

$$C_2 = \beta_2 \cdot \sigma^2 \cdot C_0 + \frac{\tau}{2} \cdot C_1 - \hat{g}_1 \quad \text{Eq. (39)}$$

$$\beta_2 = \frac{1}{2} \cdot \alpha + \frac{3}{8} \cdot (1 - \alpha) \quad \text{Eq. (40)}$$

$$\beta_3 = \frac{3}{20} \cdot \alpha + \frac{1}{16} \cdot (1 - \alpha) \quad \text{Eq. (41)}$$

$$\beta_4 = \frac{3}{100} \cdot \alpha + \frac{1}{256} \cdot (1 - \alpha) \quad \text{Eq. (42)}$$

( : response from factor)

$$K_c = C_1 \quad \text{Eq. (43)}$$

$$T_i = \frac{C_1}{C_0}$$

$$T_a = \frac{C_2}{C_1}$$

Figure 12:
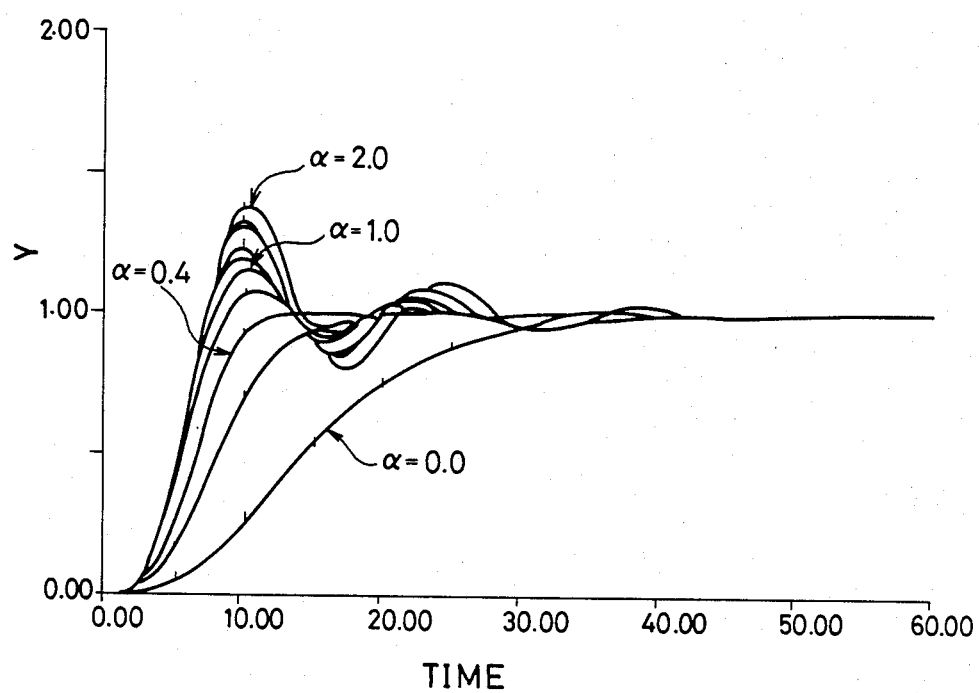
FIG. 12 is a graph showing the response characteristic of the control system in the present embodiment.

Here, the root used for Eqs.(37) through (39) is to be understood as the smallest positive root of the cubic equation (Eq.(36)). Further, by increasing the response shape factor from zero to unity it is possible to set arbitrarily the response of the control system to a step change of the reference value from a response with no overshoot, via those with a slowly increasing rise, to a response with an overshoot of about 10% in accordance with the specification of the control system, as shown in FIG. 12.

Figure 13A:
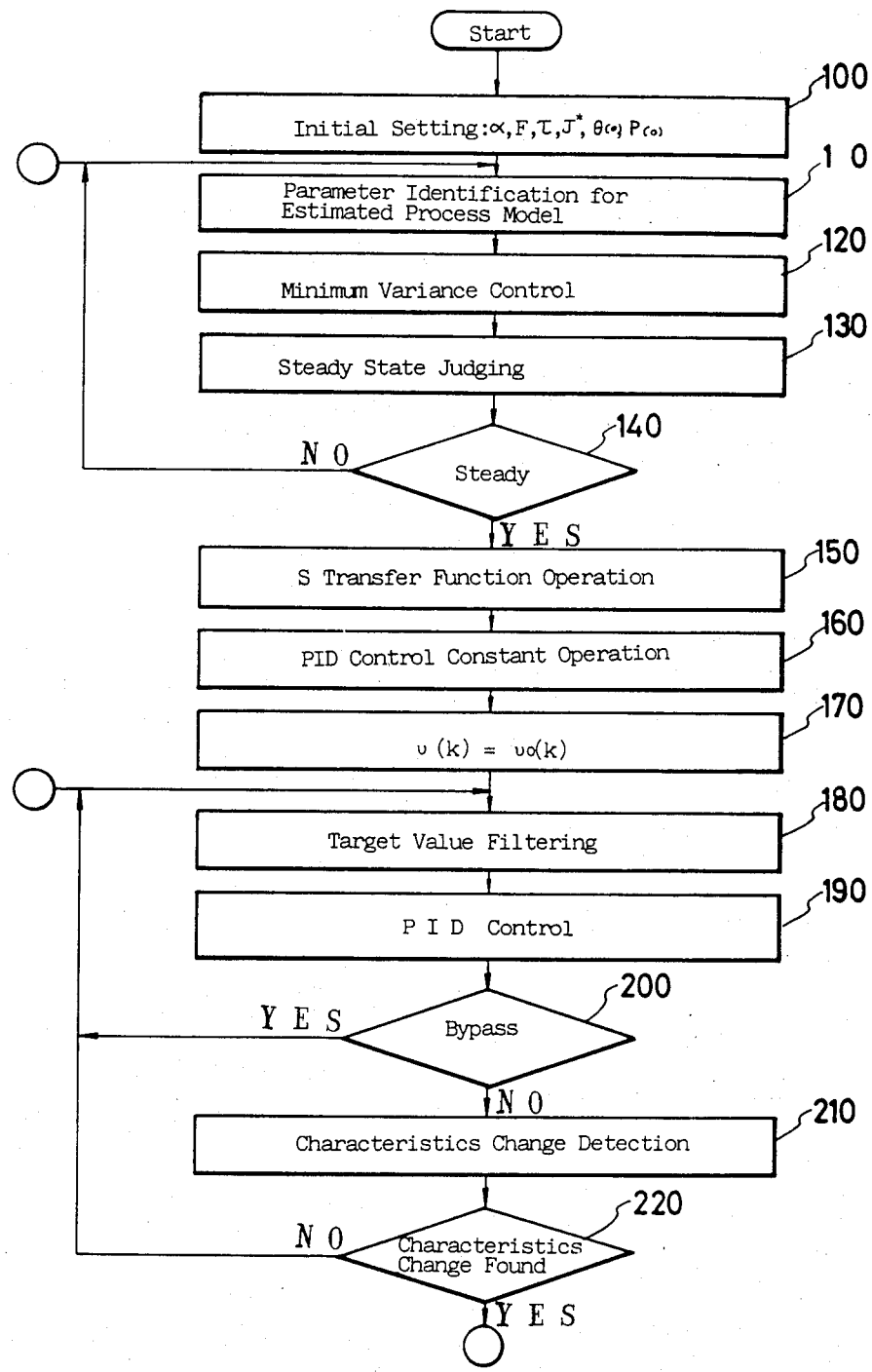
FIGS. 13a and 13b are flow charts of the control system in the present embodiment.
Figure 13B:
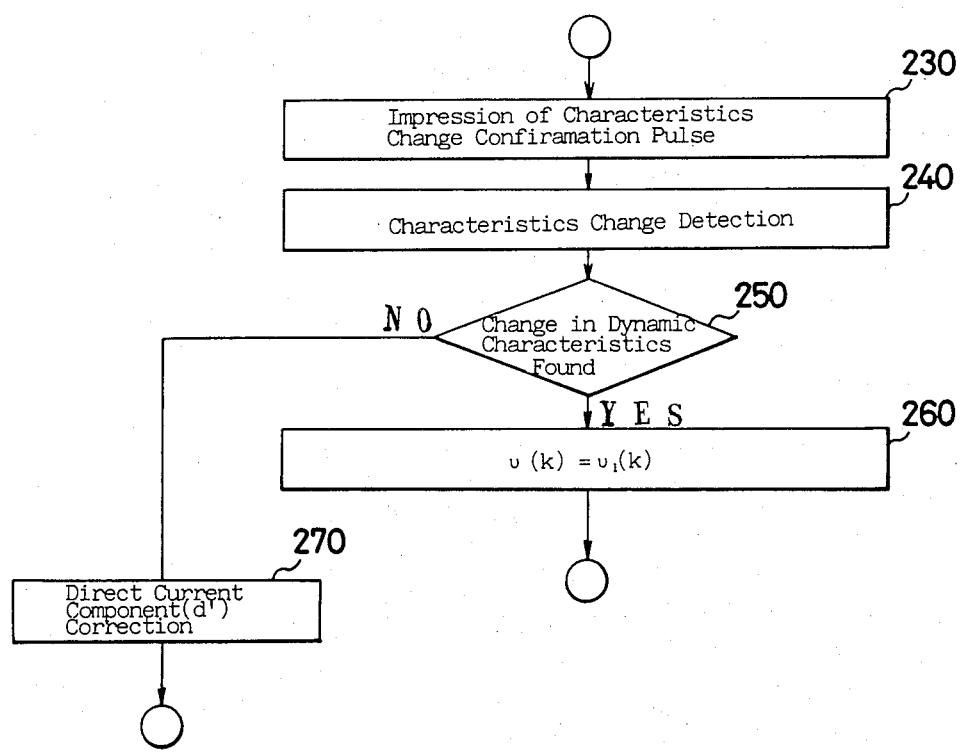

Next, the operation of the present embodiment is explained by referring to the action flow charts shown in FIGS. 13(a) and 13(b).

The control of the process starts after initial set up of the prescribed parameters or filter. In the initial stage of control it is possible that the characteristics of the process 1 are still unstable due to their transistional nature and the like so that the process 1 is at first controlled by the minimum variance method by replacing the operation signal u(k) to the process 1 by the minimum variance control signal $u_1(k)$ (Steps 110–120). When it is detected by said minimum variance control that the characteristics of the process 1 reached a steady level (Steps 130 and 140), the PID control constants )Kc, Ti, and Td) are computed (Steps 150 and 160) and a PID control is also started based on the control constants (Kc, Ti, and TD) for the process 1 by changing the operation signal u(k) to the process 1 to a PID control signal $u_0(k)$ by driving the switch of the action mode alteration switch 6 (Steps 170–190).

During this period of PID control the state of the characteristics of the process 1 is being watched, under the confirmation that said control system is not in a bypass state, based on the estimated model error η(k). However, when a change in the characteristics is detected such that the estimated model error η(k) exceeded the first threshold value $L_1$ (Steps 210 and 220), a dynamic characteristics change confirmation signal r(k) is impressed on the control system to decide whether the characteristics change is generated due to a change in the dynamic characteristics of the process 1 (Step 230). If the estimated model error η(k) is detected to have exceeded the second threshold value $L_2$ as a result of impressing the dynamic characteristics change confirmation signal Δr(k) S(Steps 240 and 250), the dynamic characteristics of the process 1 are judged to have changed and a shift to the minimum variance control of the process 1 takes place by altering the operation signal u(k) of the process 1 to the minimum variance control signal $u_1(k)$ by driving the action mode alteration switch 6 (Step 260). Moreover, if the estimated model error η(k) did not exceed the second threshold value $L_2$ in Step 250, the PID control is carried out uninterrupted by correcting for the direct current component d so as to make the estimated model error η(k) vanish (Step 270).

Therefore, in this embodiment of the invention, it is arranged in such a way that when the dynamic characteristics of the process are judged to have changed, the STR mode is selected in order to have the process controlled according to the minimum variance control method, whereas when the dynamic characteristics are found to be in steady state, the PID mode is selected to have the process controlled according to the PID control method based on the PID control constants tuned to the process characteristics that are identified by STR. Thus, based on this process control apparatus it is possible to realize automatically an extremely satisfactory control system for various changes in the process characteristics that might take place during a closed loop control.

Further, although the control apparatus for the process 1 in the present embodiment consists of discrete circuits, it may be replaced by a construction that handles the matter with microcomputers based on FIG. 13(a) or 13(b).

Moreover, the identification conditions are satisfied by carrying out the process identification with the iterative type least squares identification filter that employs an estimated model together with the minimum variance control method so that it becomes unnecessary to have a means for generating identification signals for process identification.

Figure 14:
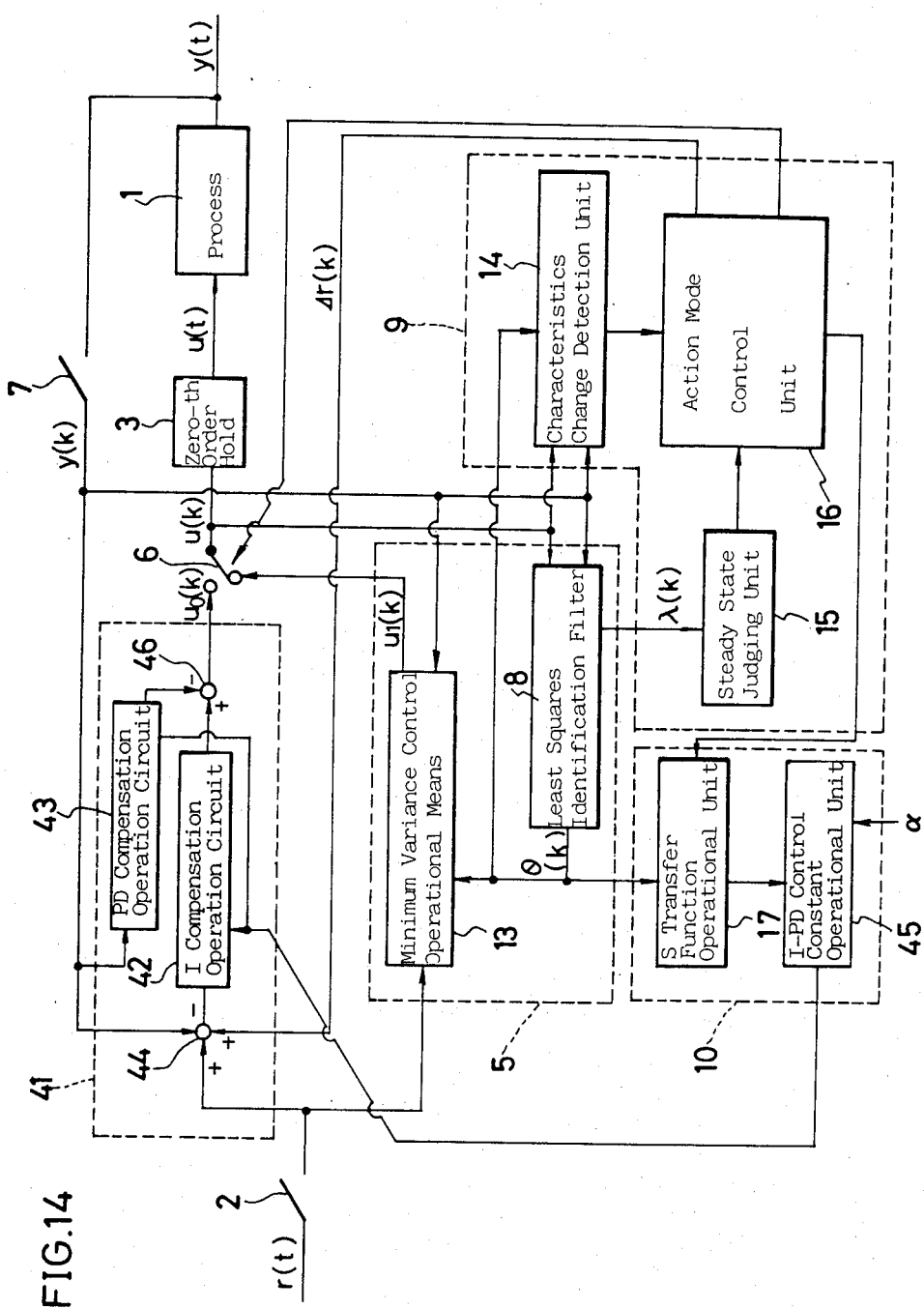
FIG. 14 is a block diagram showing another embodiment of a process control apparatus in accordance with the present invention.
Figure 15:
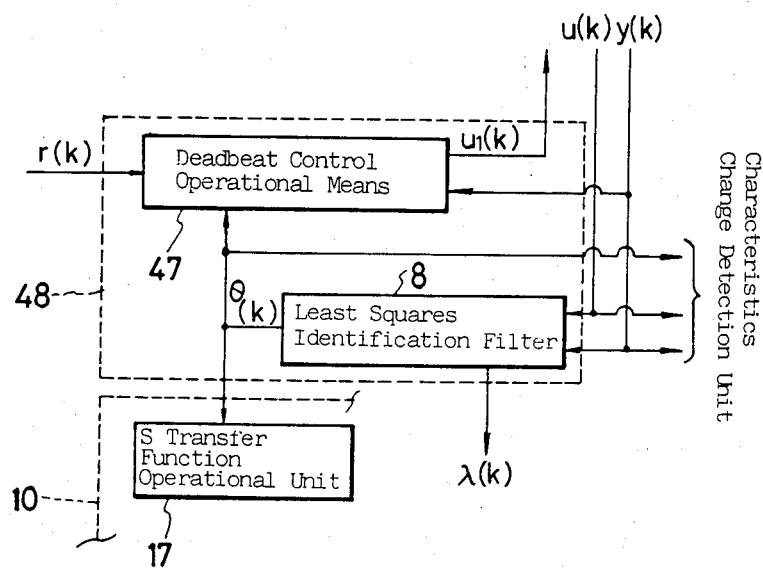
FIG. 15 is a block diagram showing the main part of a further embodiment of a process control apparatus in accordance with the present invention.
Figure 16:
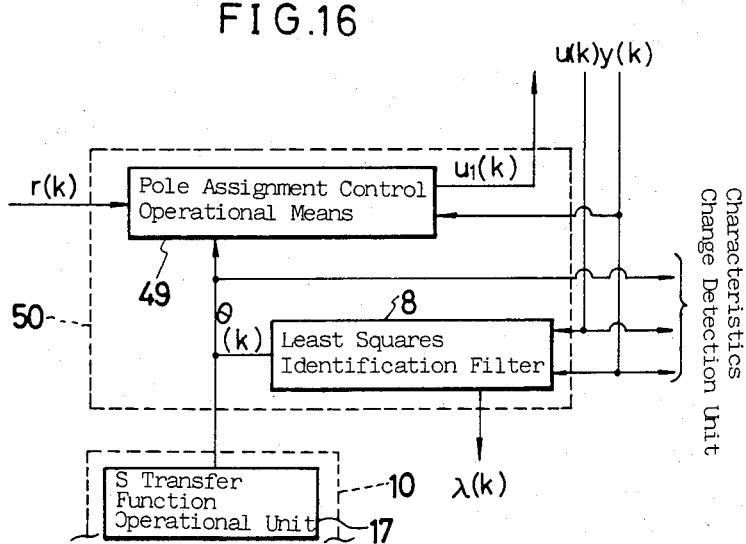
FIG. 16 is a block diagram showing the main part of still further embodiment of a process control apparatus in accordance with the present invention.

As explained in the foregoing, according to the present embodiment with a PID control means and a minimum variance control means in the process control system, an arrangement is made in such a way as to have the identification of the estimated model and the minimum variance control for those cases where the process characteristics are not constant, and to have the PID control based on the PID control constants determined by the coefficients of the estimated model for the process that are identified during the minimum variance control for those cases where the process characteristics are constant, so that an appropriate control becomes available in accordance with the state of the process characteristics, making it possible to obtain a satisfactory control performance for processes with frequently varying characteristics as well as for processes with constant characteristics. In addition, when a steady state is reached the control operation is shifted to the PID control, because the control constants for the PID control system are designed automatically from the process characteristics that are identified during the minimum variance control, so that the control signals to the process are not subject to large excursions and hence the life of the operation terminals can be extended further. Referring to FIG. 14, there is shown another embodiment of the present invention.

In the embodiment of the present invention described in the foregoing, explanation was given by employing the PID control operational means as the first process control operational means. However, it works equally well even if the PID control operational means is replaced by the I-PD control operational means 41 as shown in FIG. 14. The I-PD control operational means 41, as a sampled value I-PD operational unit, consists principally of an I compensation operation circuit 42 and a PD compensation operation circuit 43 wherein the I compensation operation circuit 42 receives, as its input, both of the output signal from the airthmetic unit 44 which adds the proving signal $\Delta r(k)$ from the action mode control unit 16 to, and subtracts the output signal y(k) of the process 1 from, the reference signal r(k) and the control constant signal from the I-PD control constant operational unit 45. Further, the PD compensation operation circuit 43 receives as its input both of the output signal y(k) of the process 1 and the control constant signal from the I-PD control constant operational unit 45. The output of the I compensation circuit 42 and the output of the PD compensation circuit 43 are so arranged as to yield an output signal $u_0(k)$ via the arithmetic circuit 46 which carries out the arithmetic operation on them. With such a construction the effectiveness of the present invention can be brought into full play be being provided with the well-known special quality characteristic of the I-PD control method.

Further, in the embodiment of the present invention described in the foregoing, the minimum variance control operational means was employed as a constituent component of STR 5, but this arrangement is not exclusive so that replacing STR 5 by an STR 48 that employs the deadbeat control operational means 47 or by another STR 50 that employs the pole assignment control operational means 49 will give rise to an equally satisfactory results.

While the invention has been described with respect to one particular embodiment, it is apparent that various modified embodiments will be obvious to those skilled in the art in view of the foregoing description. Thus, this scope of the invention should not be limited by the foregoing description, but rather, only by referene to the claims appended hereto.

What is claimed is:
1. A process control apparatus which comprises:
  a. first process control operational means (40) adapted to control a process in a first control mode by producing a first control signal $u(k)=u_o(k)$ when the characteristics of the process to be controlled are in a steady state;
  b. second process control operational means (5) including first control operational means (13) and least square identification means (8), adapted to control the process in a second control mode by producing a second control signal $u(k)=u_1(k)$ when the characteristics of the process change rapidly;
  c. first detection means (15) for detecting the steady state of the characteristics of the process in accordance with a predetermined factor from said least square identification means and for producing a first detection signal therefrom;
  d. second detection means (14) for detecting rapid changes in the characteristics of the process in accordance with a process output signal y(k), a control signal u(k) from and to the process, and an identification signal $\theta(k)$ from said least square identification means and for producing a second detection signal therefrom;
  e. a mode control unit (16) responsive to one of the first detection signal and the second detection signal, for producing a dynamic characteristic change confirmation signal $\Delta r(k)$ and a change-over signal, or an operation execution command signal in accordance with the first or second detection signal;
  f. change-over switch means (6) selectively switched to either said first process control operational means or to said second process control operational means in accordance with the change-over signal from said mode control unit means; and
  g. a control constant operation unit (18) responsive to the operational execution command signal from said mode control unit, for calculating control parameters in the first control mode in accordance with the identification signal $\theta(k)$ from the least square identification means so as to produce the first control signal $u_o(k)$, whereby said switch means is changed-over to the second process control operational means when the characteristics of the process are detected to be frequently changing while it is changed-over to the first process control operational means when the characteristics of the process are detected to be in the steady state.

2. The process control apparatus as claimed in claim 1, wherein said first control mode is a PID control and said second control mode is a minimum variance control.

3. The process control apparatus as claimed in claim 1, wherein said first process control operational means is a PID control operational means, said second process control operational means is a self-tuning regulator, and said first control operational means is a minimum variance control operational means.

4. The process control apparatus as claimed in claim 1, wherein said first process control operational means is a combination of an I-control operational means and a PD-control operational means.

5. The process control apparatus as claimed in claim 1, wherein said first control operational means is a deadbeat control operational means.

6. The process control apparatus as claimed in claim 1, wherein said first control operational means is a pole assignment control operational means.

7. The process control apparatus as claimed in claim 1, wherein the dynamic characteristic change confirmation signal $\Delta r(k)$ from the mode control means is applied to deviation calculating means in the first process control operational means.

8. The process control apparatus as claimed in claim 1, wherein said control constant operation unit further comprises s-transfer function operational unit (17) for calculating a transfer function of the process and PID control constant operational unit (18) for calculating proportional gain Kc, integral time constant Ti, and differential time constant Td from the s-transfer function calculated in the s-transfer function unit.

9. The process control apparatus as claimed in claim 1, wherein said predetermined factor from the least square identification means is a forgetting factor $\lambda(k)$.

10. A process control method for a process having a first process control operational means and a second process control operational means, which comprises the steps of:
  a. calculating an error $\eta(k)$ of an estimated model for the process to be controlled in accordance with a control signal u(k), a process output signal y(k), and an identification signal $\theta(k)$ from the following equations;

$$\eta(k) = y(k) - \sum_{i=0}^{Nv} Vi \cdot y(k - i - 1) - \sum_{i=0}^{Nq} qi \cdot u(k - i - 1) - d'$$

$$d' = \eta(k) = \frac{1}{Nn} \cdot \sum_{i=0}^{Nn-1} \eta(k - i)$$

b. determining if the error $\eta(k)$ thus calculated is larger than a predetermined first threshold level $L_1$ for determining a characteristic change in the process;

c. adding a dynamic characteristic change confirmation signal $\Delta r(k)$ to deviation calculating means in the first process control operational means so as to observe actual changes in the process characteristics;

d. determining if the error $\eta(k)$ is larger than a predetermined second threshold level $L_2$ or if $L_1 < \eta(k) < L_2$;

e. switching the process control from a first control mode to a second control mode when the error $\eta(k)$ is larger than the predetermined second threshold level $L_2$;

f. correcting only a d.c. component $d'$ of the error $\eta(k)$ to be zero without switching to the second control mode but maintaining the first control mode when the change in the error of the estimated model is small, i.e., $L_1 < \eta(k) < L_2$ in accordance with the result of the second determination; and g. switching the process control from the second control mode to the first control mode when the process becomes a steady state, such that $\eta(k) < L_1$ with the residual $l\epsilon(k)$ being small.

11. The process control method as claimed in claim 10, wherein the first control mode is a PID control and the second control mode is a minimum variance control.

12. The process control method as claimed in claim 11, wherein the minimum variation control is performed at the initial condition of the process control when the characteristics of the process are not yet stable during a transient period.

13. The process control method as claimed in claim 10, wherein the first control mode is a combination of I-control and PD control.

14. The process control method as claimed in claim 10, wherein the second control mode is a deadbeat control.

15. The process control method as claimed in claim 10, wherein the second control mode is a pole assignment control.

16. The process control method as claimed in claim 10, wherein the minimum variation control is performed at the initial condition of the process control when the characteristics of the process are not yet stable during a transient period.

* * * * *